Jan. 15, 1946.    E. E. ARNOLD ET AL    2,393,010
MARINE FRICTION COUPLING
Filed Jan. 14, 1943

WITNESSES:
C. J. Welles.
E. F. Oberhein.

INVENTORS
Edwin E. Arnold and
Vincent M. White.
BY
Paul E. Friedemann
ATTORNEY

Patented Jan. 15, 1946

2,393,010

UNITED STATES PATENT OFFICE 2,393,010

MARINE FRICTION COUPLING

Edwin E. Arnold, Pittsburgh, Pa., and Vincent M. White, Washington, D. C., assignors to Westinghouse Electric Corporation, East Pittsburgh, Pa., a corporation of Pennsylvania Application January 14, 1943, Serial No. 472,348

3 Claims. (Cl. 192—88)

The present invention relates generally to apparatus for transmitting power from one section of shafting to another and more particularly to apparatus for transmitting power from a relatively low power and relatively high speed auxiliary motor to a main drive shaft where it is desired to engage and disengage such auxiliary power source at will.

The invention is specifically shown in the drawing as being applied to a marine propulsion system, however, this is not to be considered in any limiting sense since the invention is obviously not only applicable to marine uses, but for any transmission of power from one section of shafting to another.

Broadly stated the object of the present invention is to provide means in a marine propulsion system whereby an auxiliary power unit may be connected to or disconnected from the propeller shaft of a ship.

More specifically stated an object of the invention is to provide clutch means for mechanically interconnecting the power output shaft of an auxiliary power source with the propeller shaft of a ship.

Still more specifically stated an object of the invention is to provide a friction clutch mechanically interconnecting the power output shaft of an auxiliary power source with the propeller shaft of a ship.

Other objects and advantages will become more apparent from a study of the following specification when considered in conjunction with the accompanying drawing, in which.

Figures 3, 4:
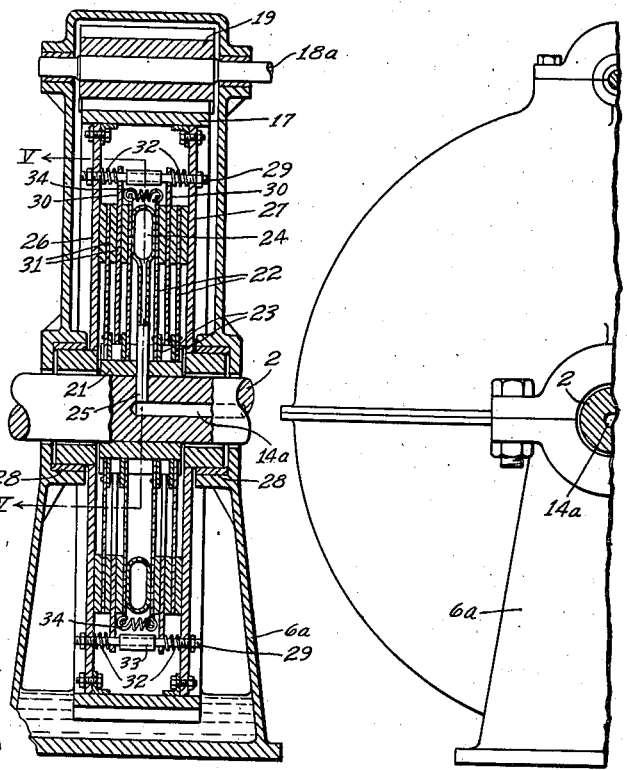
Fig. 3 is a modification of the invention illustrated in Figs. 1 and 2.

Fig. 4, in an end view of Fig. 3; and

Figure 5:
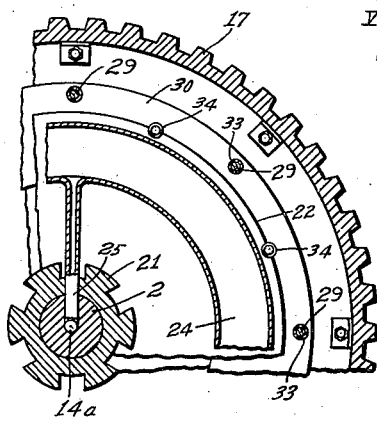

Fig. 5 is a sectional view taken on the line V—V of Fig. 3.

Figure 1:
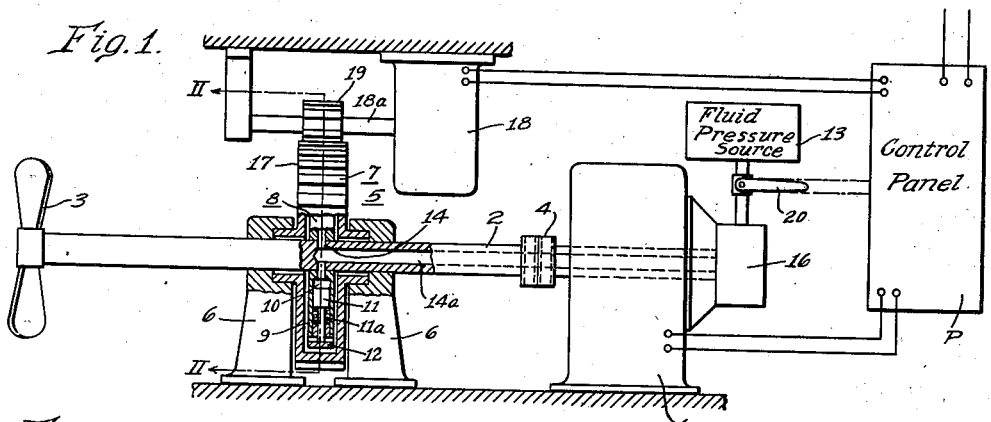
Figure 1 is a schematic arrangement of a shaft system embodying the principles of this invention.
Figure 2:
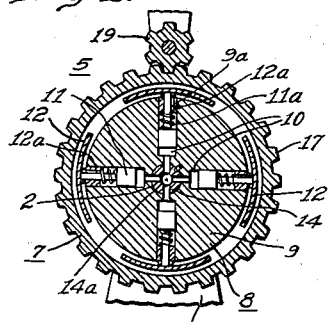
Fig. 2 is a sectional view taken on the line II—II of Fig. 1.

Referring now to the drawing, Fig. 1 schematically illustrates a shaft system for a marine application. A main prime mover denoted by numeral 1 drives a shaft 2 having secured at its extremity a propeller 3. The propeller shaft is shown directly connected to the prime mover, however, various gear ratio units may be interposed therebetween. The prime mover may be an electric motor, a steam turbine, or a Diesel engine. If a Diesel engine or other reciprocating engine drive is used, however, it will be desirable to include a clutch 4 in the shaft whereby the Diesel engine may be disconnected from the shaft 2 when the shaft is driven from some external source of power other than the Diesel engine. The clutch 4 has been illustrated schematically since it forms no part of the present invention and any suitable type of clutch may be used. Conveniently disposed about the shaft 2 is a friction clutch generally denoted by the numeral 5 which is shown supported in pedestal bearings 6 which also support the main drive shaft 2. The friction clutch comprises driving and driven elements numbered 7 and 8, respectively. The driven element 8 comprises a circular piston block 9 which is rigidly secured to rotate with the main shaft 2. The circular block 9 has radially disposed therein a plurality of bores or cylinders 10 (see Fig. 2) each of which has radially movable therein a piston 11 carrying a rod slidably mounted in the bearing plug 9a at the outermost extremity of which rod is secured a friction shoe 12 having an arcuate peripheral surface thereof of a shape to conform with the inner periphery of the driving element 7. A helical spring 11a disposed about the rod between the piston 11 and the bearing plug 9a is of such strength as to overcome the centrifugal forces normally acting upon the piston and friction shoe assembly thus maintaining the friction shoe in its inoperative position until fluid pressure is applied. A small slot or opening 12a is provided in the bearing plug 9a to provide a passage for air as the volume of the chamber between the piston and the plug 9a changes during operation of the piston. The cylinders 10 are in communication with a suitable source of fluid pressure 13 through the radial holes 14 interconnecting the cylinders 10 and the hollow shaft portion 14a which in turn is connected to the fluid pressure source through a fluid chamber 16 to which it may be connected by any suitable rotating seal (not shown). The driving element comprises essentially an annular gear 17 rotatably mounted in the pedestal bearings 6 and concentrically positioned relative to the shaft 2 having an inner peripheral surface adapted to be engaged by the friction shoes 12. Conveniently located with respect to the friction clutch 5 is relatively low power high speed auxiliary motor 18, of sufficient capacity to propel the ship alone, to the shaft 18a of which is secured a driving pinion 19 in continuous engagement with the annular gear 15 of the friction clutch driving element 17. The prime mover 1 and the auxiliary motor 18 are each connected to a suitable power source by means of a control panel P.

A valve 20 in the fluid pressure line may either be manually controlled as shown or be controlled from the control panel as indicated by the dot dash lines.

The auxiliary motor is intended to serve as a means for operating the propeller at low positive speeds thus making it possible to maneuver the vessel in confined areas as, for example, in docking operations, both economically and safely. To engage the auxiliary motor with the main drive shaft it is only necessary to energize the auxiliary motor 18 from the control panel P whereby it is brought up to speed running at substantially no load and by means of the hand controlled valve, or a remote control on the control panel, supply fluid pressure to the friction clutch, to gradually engage the friction shoes 12 with the driving element thus engaging the auxiliary motor 18 with the main shaft 2 and driving the propeller. In some cases it may be desirable to utilize the auxiliary motor to supplement the main prime mover 1. This would be possible only, however, if the main shaft were not operating at a speed beyond that which the auxiliary motor could drive it. Otherwise the auxiliary motor would serve as an additional drag on the prime mover 1.

Figures 3, 4 and 5 illustrate a preferred modification of this invention. Parts appearing in these figures corresponding to those appearing in Figs. 1 and 2 will be given like reference numerals. Numeral 2 again designates a main drive shaft which is to be connected and disconnected from the auxiliary shaft 18a. Housing 6a completely encloses the friction clutch 5 and serves as a bearing support only for the clutch itself, the main shaft 2 being supported in its own bearings (not shown). The driven element comprises a splined collar member 21 secured to the shaft 2 which has in splined engagement therewith a plurality of axially spaced light disc members 22 which are reinforced at the point of their splined engagement with the collar 21 by the annular internally splined members 23 which prevent failure of the discs 22 due to excessive shear stresses therein when the clutch is engaged. Disposed between the centermost discs 22 is an annular flexible tube-like member 24 having a valve 25 projecting from its inner periphery connected to the radial hole 14 thus connecting the tube to the hollow portion 14a of the main shaft 2 which may be in communication with a fluid pressure source as illustrated in Fig. 1. The driving element 7 comprises an annular gear 17 concentrically supported about the shaft on the end plates or discs 26 and 27 by means of the bearings 28 in the housing 6a. A plurality of rods 29 interconnecting the end plates 26 and 27 have axially slidably mounted thereon a plurality of flat annular elements 30 carrying the friction members 31. The elements 30 are disposed between the discs 22 and are biased towards a central position by the helical compression springs 32 disposed between the end plates 26 and 27 and the ring elements 30. Axial travel towards center of the ring elements 30 is limited to a predetermined spacing by the tubular section 33 disposed centrally about the rods 29. Tension springs 34 interconnecting the discs 22 disposed on either side of the annular tube member 24 serve to axially move the interconnected discs toward center when the fluid pressure is removed. The combined action of the springs 32 and 34 thus breaking the frictional engagement of the discs 22 and the annular ring element 30. Pinion 19 secured to the shaft 18a continuously engages the annular or ring gear 17. As may be seen from Fig. 4, the pedestal housing 6a is axially split relative to the shafts 2 and 18a. With this construction the friction clutch may be positioned in the lower housing portion and the upper portion positioned thereon and clamped or bolted in position. Upon positioning the driving pinion 19 in engagement with the gear 17 the housing portion enclosing the pinion is then bolted in place.

Assuming now that the shaft 2 is to be driven by the shaft 18a the annular tube member is expanded by the application of fluid pressure. As the tube is expanded axially the discs 22 in contact therewith are moved axially to bear against the cooperating friction members 31 and thus axially move the ring element 30 and the balance of the discs 22 until a pressure of engagement proportional to that exerted by the fluid pressure in the tube 24 is obtained at which time the friction forces secure the driving element to the driven element of the clutch and the shaft 2 is driven by the shaft 18a.

By using the disc type of clutch it is possible to measurably increase the friction forming areas thus decreasing the unit pressure necessary to transmit an applied force. In the same manner the annular tube member with its large contacting area provides a uniformly distributed applied pressure and due to the large area of applied pressure measurably reduces the required fluid pressure.

The foregoing disclosure and the showings made in the drawing are merely illustrative of the principles of this invention and are not to be interpreted in a limiting sense. The only limitations are to be determined from the scope of the appended claims.

We claim as our invention:

1. A friction clutch comprising, in combination, a pair of relatively rotatable elements, the first of said elements being rotatably and concentrically disposed relative to and enclosing the second of said elements, an axially expandable annular tube-like member carried by the second of said elements, a first pair of discs one disposed on each side of said annular tube-like member in splined engagement with the second of said elements and being axially movable with respect thereto, means for biasing said discs axially against said annular tube-like member, a second pair of discs, each disposed axially of one of said first pair of discs and engaging for rotation with and axial movement with respect to, the first of said elements, means for limiting the axial movement of the second discs in the direction to engage the first mentioned discs, a third pair of discs in splined engagement with the second of said elements and having freedom of axial movement with respect thereto, each of said third pair of discs being axially disposed of said second discs and being unbiased in an axial direction, a fourth pair of discs forming the axial extremities of the first of said elements, and having bearing surfaces thereon for concentrically supporting the first of said elements with respect to the second said elements, and means for supplying a fluid medium under pressure to said annular tube-like member.

2. A friction clutch comprising, in combination, a pair of relatively rotatable elements, the first of said elements being rotatably and concentrically disposed relative to and enclosing the second of said elements, an axially expandable annular tube-like member carried by the second of said elements, a first pair of discs one disposed on each side of said annular tube-like member in splined engagement with the second of said elements and having freedom of axial movement with respect thereto, a plurality of tension springs axially connecting said first pair of discs about their peripheries for biasing said first discs axially against said annular member, a second pair of discs, each disposed axially of one of said first pair of discs, a plurality of bars axially connecting said second pair of discs about their peripheries such that said discs have freedom of axial movement along said bars, a sleeve disposed about each of said bars between said pair of discs for providing a predetermined axial spacing thereof, end plates forming the axial extremities of the first of said elements and having bearing surfaces thereon for concentrically supporting the first of said elements with respect to the second of said elements, each of said bars being supported axially between said end plates, compression springs on each of said bars disposed between each of said end plates and said second discs for biasing the second discs against the extremities of said sleeves, a third pair of discs each disposed between one of said second discs and the adjacent end plate, said third pair of discs being in splined engagement with the second of said elements and having unbiased freedom of axial movement with respect thereto, and means for supplying a fluid medium under pressure to said annular expandable member.

3. A friction clutch comprising, in combination, a shaft having a hole axially thereof for conducting a fluid medium under pressure therethrough, a splined section on said shaft, an annular tube-like resilient member concentrically disposed about said shaft, at least one tubular member connecting said tube-like member with the hole in said shaft, a member having a pair of end plates forming the axial extremities thereof concentrically journaled with respect to said shaft at positions on opposite sides of said splined section, a first pair of discs, one disposed on each side of said tube-like member in splined engagement with said splined section and being movable axially with respect thereto, a plurality of tension springs axially connecting said first pair of discs about their peripheries for biasing said first discs axially against said tube-like member, a second pair of discs each disposed axially of said first pair of discs, a plurality of bars axially carried between said end plates of said member and engaging said second discs for rotation with said member and permitting axial movement of said second pair of discs with respect to said member, a sleeve disposed about each of said bars between said second pair of discs to provide a predetermined axial spacing thereof, compression springs disposed about each of said bars between each of said second pair of discs and said end plates, and a third pair of discs, each axially disposed between one of said second pair of discs and one of said end plates, in splined engagement with said splined section to rotate therewith and having unbiased freedom of axial movement with respect thereto.

EDWIN E. ARNOLD.
VINCENT M. WHITE.